Aug. 23, 1966  R. W. KEITER  3,268,093

OBJECT HANDLING SYSTEM

Filed March 18, 1964  5 Sheets-Sheet 1

INVENTOR.
ROBERT W. KEITER
BY Gerald L. Moore
ATTORNEY

Aug. 23, 1966
R. W. KEITER
3,268,093
OBJECT HANDLING SYSTEM
Filed March 18, 1964
5 Sheets-Sheet 2
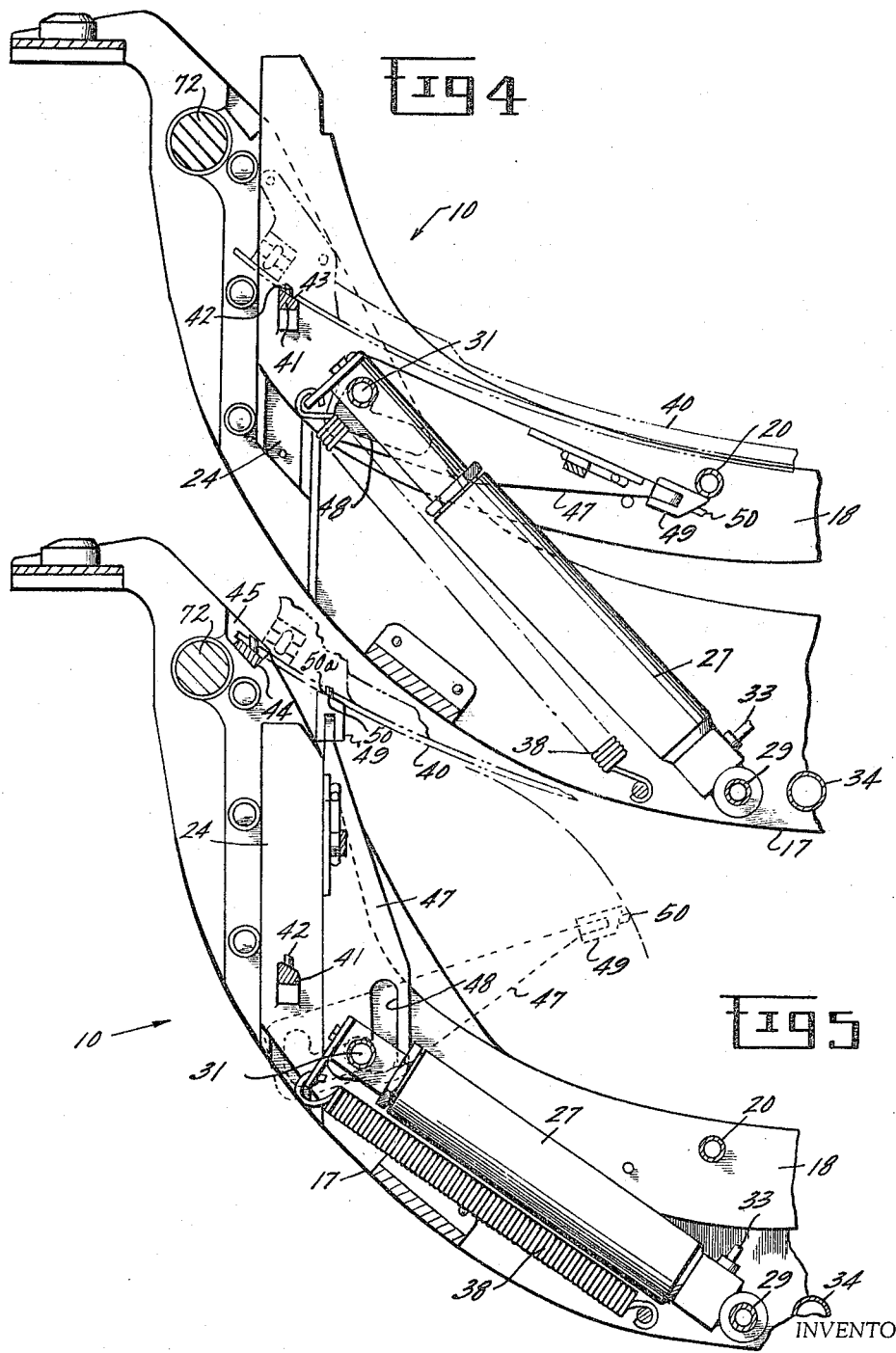
INVENTOR.
ROBERT W. KEITER
BY
gerald L Moore
ATTORNEY —

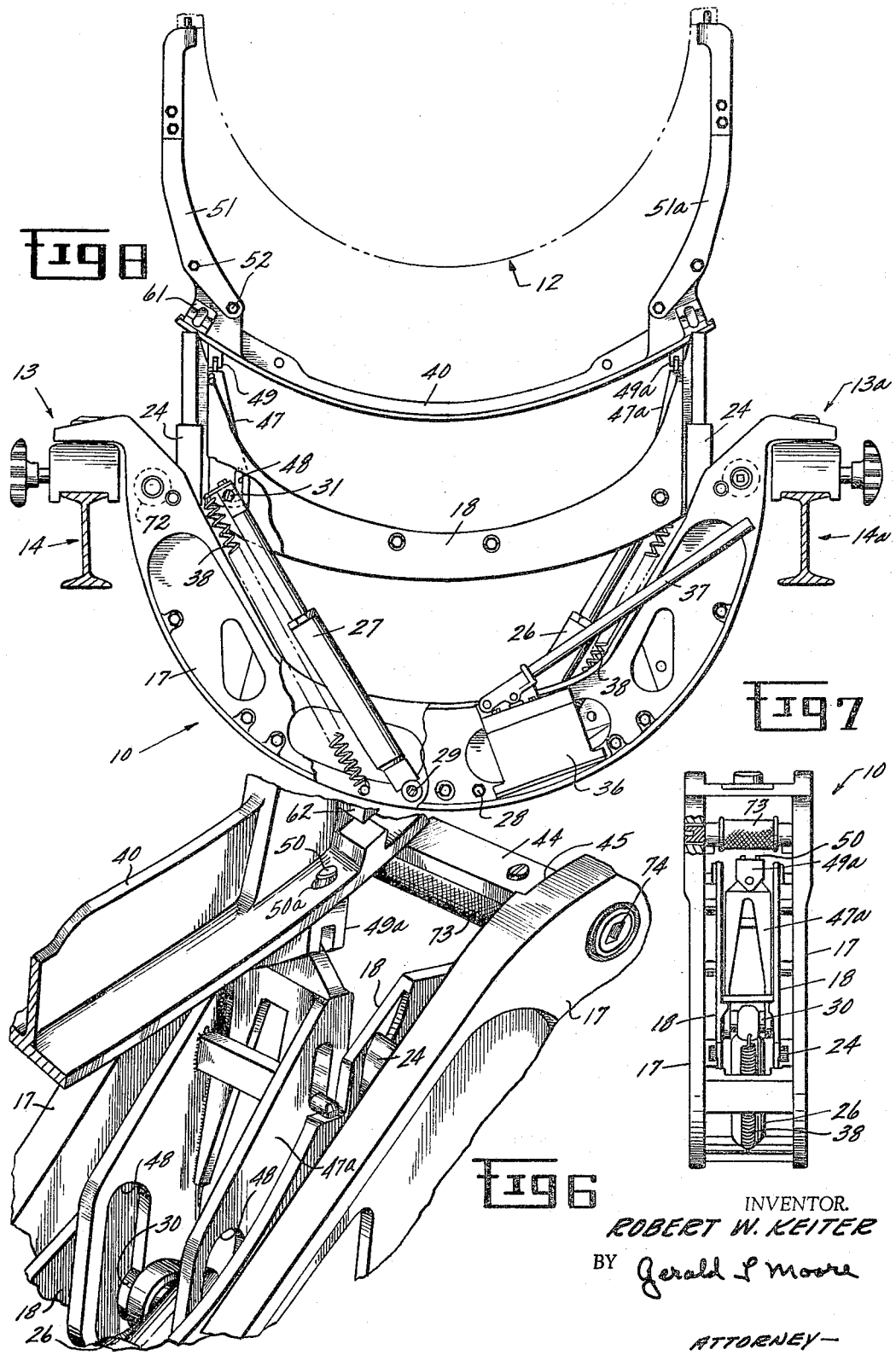

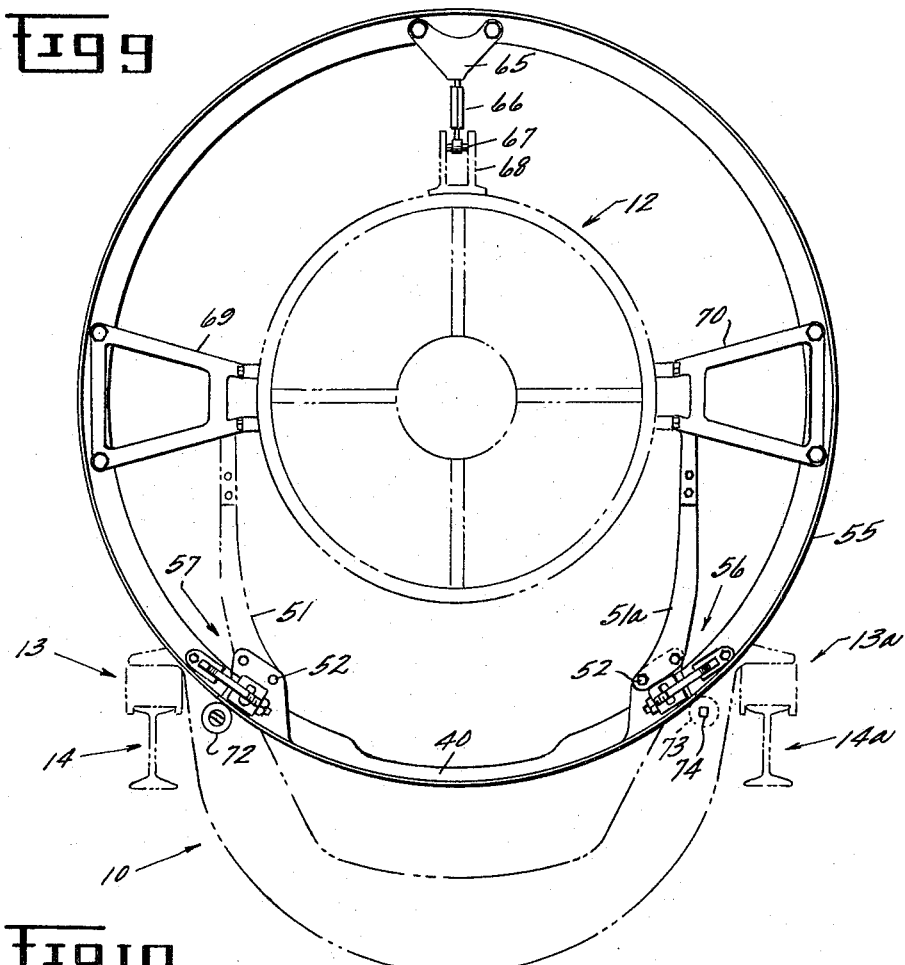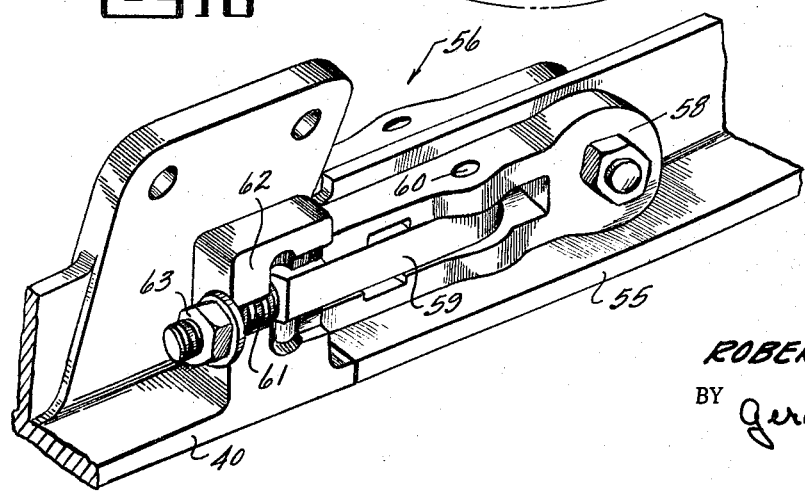

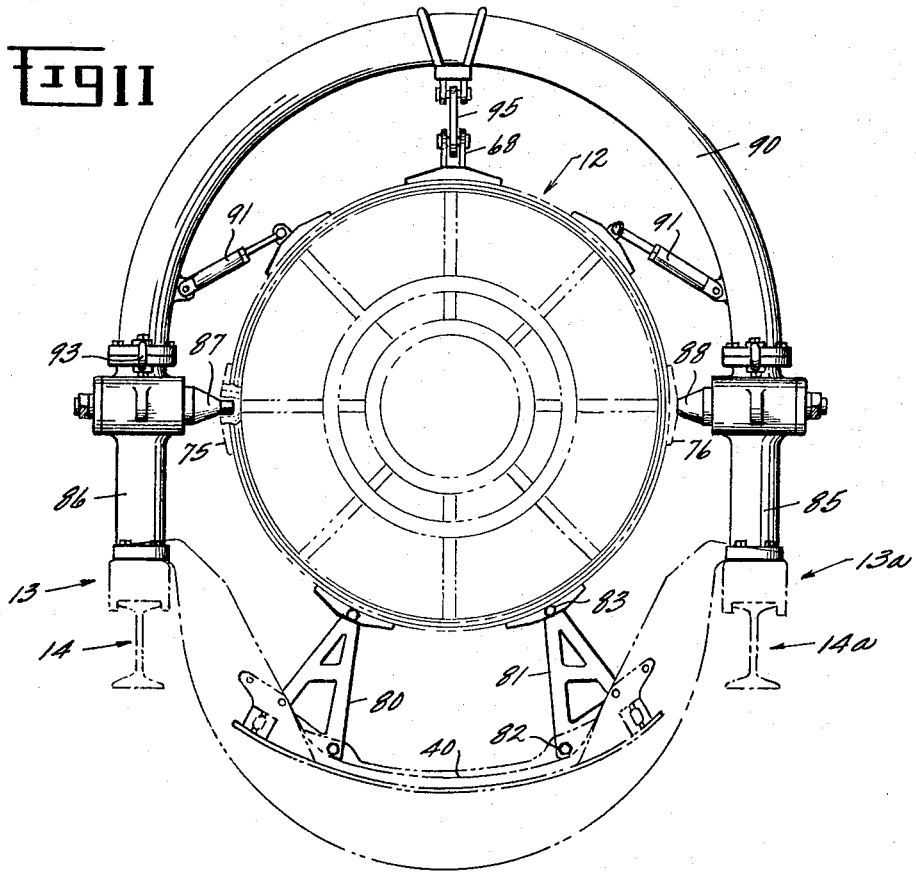
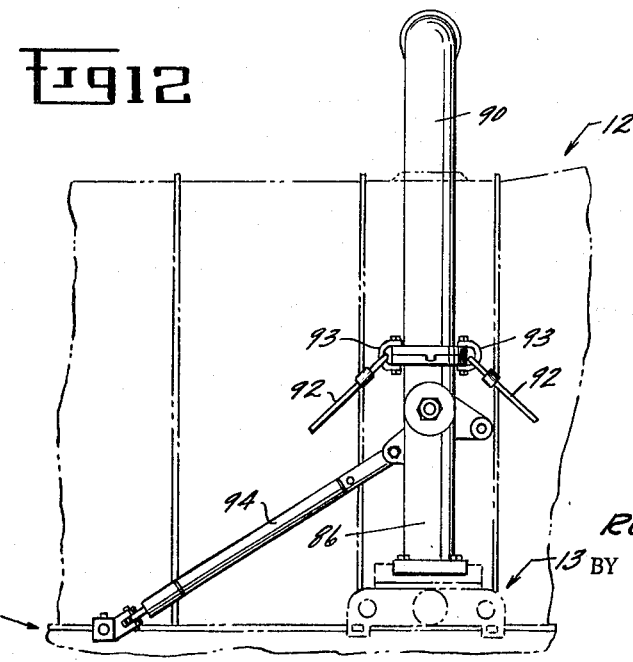

United States Patent Office 3,268,093
Patented August 23, 1966

3,268,093
OBJECT HANDLING SYSTEM
Robert W. Keiter, Cincinnati, Ohio, assignor to General Electric Company, a corporation of New York
Filed Mar. 18, 1964, Ser. No. 352,913
7 Claims. (Cl. 214—1)

This invention relates to an object handling system and more specifically, to an object handling mechanism which is self-contained to allow precise handling and positioning of the object.

In many industries, and specifically, in the aerospace industry, it is necessary to provide handling mechanisms for supporting objects such as turbojet engines or missiles in a manner to allow disassembly of the objects as well as precise positioning of the objects while they are being repaired, tested or positioned at their ultimate place of usage. For instance with turobjet engines it is necessary to provide handling systems for supporting the engine when it is removed from the airframe with further means necessary to allow disassembly of the various components of the engine during overhaul or repair procedures. It is also necessary that such handling systems be small, lightweight, compact and self-contained due to the necessity of being transported and stored when not in use while preferably being sufficiently strong to support such heavy apparatus as turbojet engines during ground running operations.

It is therefore one object of this invention to provide a compact object handling system with self-contained means for lifting, positioning and supporting the object during handling or disassembly.

It is a further object of this invention to provide an object handling apparatus incorporating attachment means for supporting the object in a plurality of positions with means for mounting the handling apparatus on a rail or portable vehicle.

In carrying out these and other objects of this invention there is provided an object handling and support system comprising means for attachment to the object and a cradle means for positioning on a rail or portable vehicle with self-contained position adjusting means extending from the cradle to the support means including guide means interfitting between the cradle and the support means to allow differential movement therebetween with a lifting mechanism to effect this differential movement for positioning the object by movement of the support means.

Figure 1:
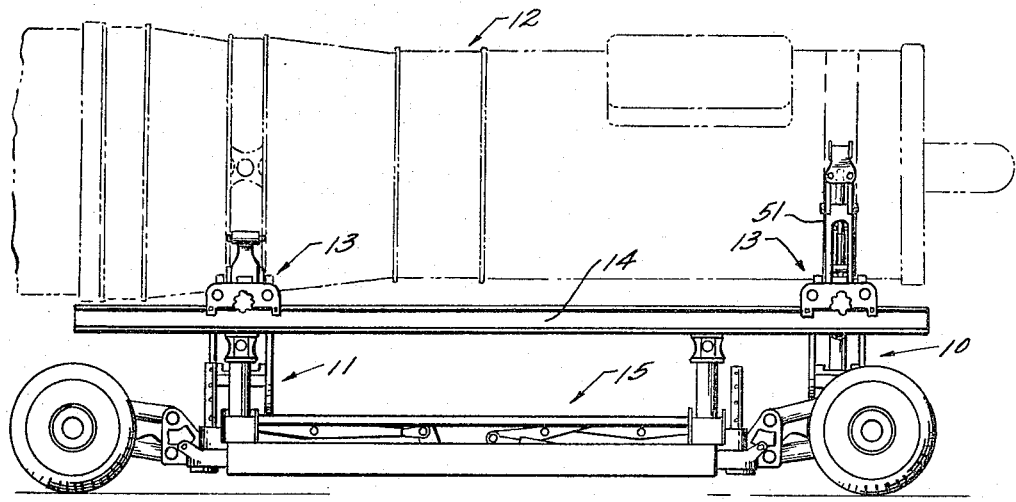
Figure 3:
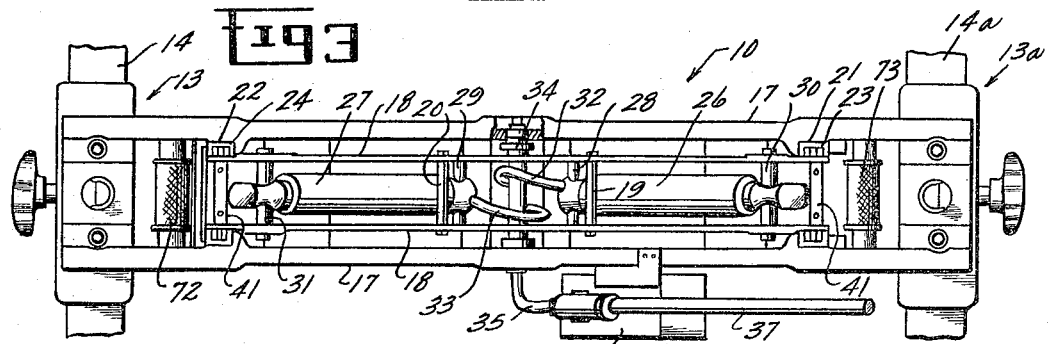
Figure 2:
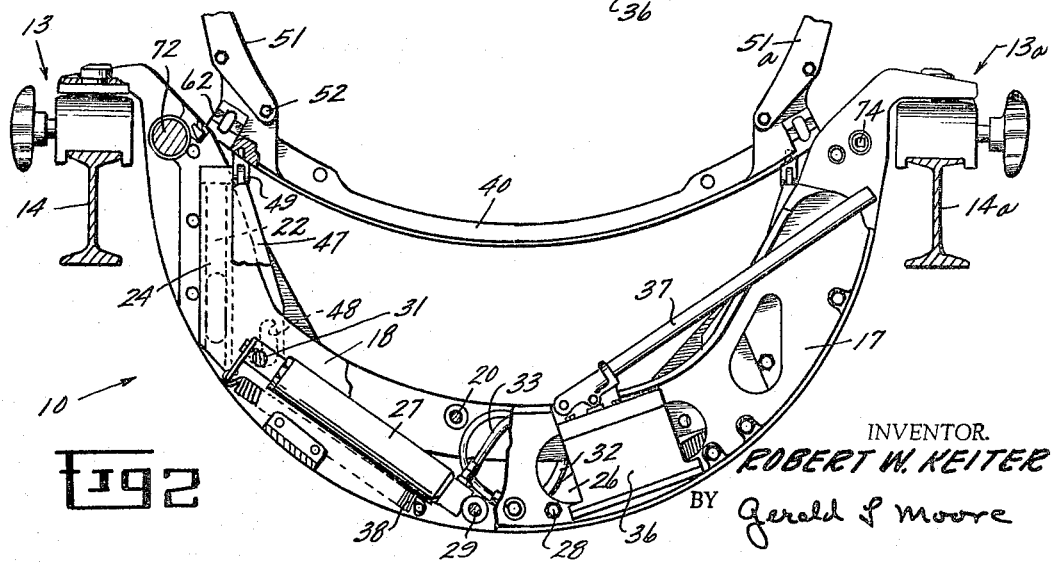

Other objects and many of the attendant advantages of this invention will be readily appreciated as the same becomes better understood by reference to the following detailed description when considered in connection with the accompanying drawings wherein:

FIG. 1 illustrates the support system positioned on a portable vehicle with the supported object or turbojet engine illustrated in phantom, FIG. 2 is an end view partially in section of the cradle positioned on the rails of a portable vehicle, FIG. 3 is a top view of FIG. 2, FIG. 4 is an enlarged end view partially in section of a portion of the cradle, FIG. 5 is the same view as FIG. 4 with the riser block rotated, FIG. 6 is a perspective view of a portion of the cradle, FIG. 7 is a side view of the cradle, partially in section, FIG. 8 is an end view of the cradle, partially in section with the engine support and lower rollover ring segment added, FIG. 9 is an end view of the assembled rollover ring with attached engine supports, FIG. 10 is a perspective view of a portion of the rollover ring showing the locking mechanism, FIG. 11 is an end view of the transportation and test yoke, and FIG. 12 is a side view of the transportation and test yoke with attached braces.

Referring now primarily to FIGS. 1 through 5, illustrated is the support system comprising cradle members 10 and 11 supporting an engine 12 illustrated in phantom with the cradles 10 and 11 mounted on roller adapters 13 and 13a respectively as illustrated in FIG. 2, which in turn fit upon rails 14 and 14a mounted on the portable vehicle generally indicated at 15. The roller assembly is described in U.S. Patent 3,111,912—Keiter assigned to the same assignee, while a representative portable vehicle 15 is illustrated in U.S. Patent 2,820,642—Harper. The overall purpose for such a support system is to handle such objects as aircraft turbojet engines which must be supported and vertically lifted when removed from the airframe in a manner to allow roll transfer from one rail-type vehicle or work stand to another and differential longitudinal movement of various sections of the engine for overhaul or repair operations as well as allowing for transportation, shipping and ground test running for test purposes. In addition to moving the components axially it is necessary that the engine be raised or lowered and tilted if necessary for installation into the airframe as well as supporting one end of the engine for longitudinal movement of the engine after the opposite end is attached to the airframe as is necessary when installing the engine in some aircraft.

To accomplish this there is provided at least one and generally a plurality of cradle assemblies 10 comprising an outer housing 17 of a U configuration to allow positioning the engine between the support rails 14 and 14a. While one cradle assembly will be described, a plurality of cradle assemblies may be used to support an object such as a turbojet engine. Supported within the cradle is an inner cradle member 18 assembled with bolts and spacers 19 and 20 which includes guides 21 and 22 fitting within the ways 23 and 24 respectively of the outer cradle member in a manner to allow only vertical movement of the inner cradle with respect to the outer cradle housing 17. A pair of actuators 26 and 27 extend from lower trunnions 28 and 29 fastened to the outer cradle member to the upper trunnion members 30 and 31 attached to the inner cradle member such that by extension of these actuators a force is exerted having a vertical component so as to cause the inner cradle to move vertically within the ways 23 and 24 of the outer cradle member. In this illustration the actuators are the hydraulic type with hoses 32 and 33 extending to a central manifold 34 to which is attached the output conduit 35 of a hydraulic pump 36 such that by moving a handle 37 the hydraulic pump will force hydraulic fluid through the hose 35, manifold 34 and hoses 32 and 33 to cause the actuators to extend in the known manner. The actuators are pivotally attached at the upper trunnions 30 and 31 and at the lower trunnions 28 and 29 such that as the inner cradle rises the actuators may pivot with respect to both the inner and outer cradles to allow the vertical movement of the inner cradle with respect to the outer cradle. A cylinder return spring 38 is provided to assist return of the inner cradle into the outer cradle when the pressure within the hydraulic cylinders is reduced. It may therefore be seen that by operation of the actuators 26 and 27 the inner cradle may be moved differentially with respect to the outer cradle and with the outer cradle mounted in the horizontal position between the rails 14 and 14a as illustrated, a vertical position adjustment of the inner cradle is effected.

Supported from the inner cradle 18 is a rollover ring segment 40 which interfits with the tie 41 supported on the inner cradle 18 with studs 42 fitting into openings 43 within the rollover ring assembly 40. Engine supports 51 and 51a extend from this rollover ring to the engine being supported. The rollover ring segment is lifted vertically by lifting the inner cradle 18 as illustrated in FIG. 4 to vertically position the engine. However, it is frequently necessary to lift the engine further than the normal stroke of the actuators 26 and 27 and to provide actuators having longer stroking would make them too large for self-containment in the inner cradle 18. To overcome this the inner cradle is raised to the position illustrated in FIG. 5 and uplocks 44 are placed within indents 45 of the outer cradle 17. After placement of the uplocks pressure is reduced within the hydraulic cylinders to allow the inner cradle 18 to lower at which time the rollover ring segment 40 comes to rest on the uplocks 44 and the weight supported by the rollover ring segment is transferred through the uplocks to the outer cradle by these uplocks 44 within the indents 45 thereby allowing the inner cradle to be lowered to its original position as illustrated in FIG. 5 without lowering the supported engine. Pivotally supported within the lower cradle are a pair of riser blocks 47 with the upper trunnions 31 passing through the L-shaped slot 48 in the riser block. While the ring segment 40 is resting on the uplock 44 and with the riser block 47 manipulated such that the upper trunnion 31 passes through the elongated portion of the L-shaped slot 48, the riser block 47 may be pivoted from its rest position as illustrated in FIG. 5 through the position illustrated by the dotted line to the vertical position as illustrated by solid outline. Thereafter with the pivotal extension 49 on the riser block 47 positioned such that the studs 50 interfit with the openings 50a in the rollover ring segment 40, the bottom of the riser block 47 may be manually shifted towards the center so that the upper trunnion 31 now rests within the lower portion of the L-shaped slot 48 as illustrated in FIG. 5. The L-shaped slot within the riser block allows the riser block to pivot clear of the rollover ring segment as illustrated in FIG. 5 and bridge the vertical distance to the rollover ring segment allowing utilization of the full stroke of the hydraulic unit a second time to raise the engine to a higher position.

In FIG. 8 the lower rollover ring segment 40 and the engine supports 51 and 51a are fastened to the rollover ring segment 40 by bolts 52 with one engine support extending to each side of the engine 12 illustrated in phantom. The hydraulic cylinders 26 and 27 raise the inner cradle 18 with the attached riser blocks 47 and 47a which through the pivotal extensions 49 and 49a support the lower rollover ring segment 40 and the engine supports 51 and 51a to allow raising the engine to a height considerably exceeding that of the original support rails 14 and 14a. With the engine raised to this position, keeping in mind that a similar engine support 11 is generally utilized on the opposite end of the engine, by suitable actuation of the hydraulic cylinders the engine may either be raised to the full extent or tilted to allow its attachment within the engine mounts of an aircraft; or suitable maintenance may be performed on the engine as desired. However, the engine is raised to this height by means of the original compact self-contained unit within the cradle 17 with the attachments provided.

It may also be desirable to rotate the engine about its longitudinal axis for access to various components on the engine which are inaccessible with the engine in its original position. To accomplish this, referring now to FIG. 9 with the engine in this vertical position resting on the forward engine supports 51 and 51a an upper rollover ring segment 55 is attached to the lower ring segment 40. Swing bolt locks generally indicated at 56 and 57 are provided for fastening the ring segments together as illustrated in enlarged detail in FIG. 10. An end fitting 58 includes a pin 60 passing through and pivotally supporting a swing bolt 59 having a threaded portion 61 which extends through the boss 62 attached to the lower ring segment 40 such that when the swing bolt 59 is pivoted to the position illustrated and a nut 63 is tightened on the bolt the upper rollover ring segment 55 is aligned with and attached to the lower rollover ring segment 40. Swing bolt 59 on lock 57 is fastened in the identical manner forming a complete ring extending around the engine, and similarly a ring is assembled to the other cradle assembly 11 supporting opposite end of the engine in a like manner if another assembly is utilized. At this time the bracket 65 is attached to the upper rollover ring segment which in turn supports a turn buckle link 66 and connecting pin 67 fitting into a handling bracket 68 on the engine such that by turning the turn buckle the weight of the engine is then supported from the rollover ring through the bracket 65. With the engine so supported the engine supports 51 and 51a corresponding and supports on the other cradle assembly are removed and brackets 69 and 70 are bolted to the upper rollover ring segments on each side of the engine to attach to mounting points on the engine. The engine is now rigidly supported within the rollover ring assembly. At this time, hydraulic pressure in the actuators 26 and 27 is reduced to lower the rollover ring segment 40 and allow it to come to rest on the separated rollers 72 and 73 fitting within the cradle assembly 17. With the same operation effected at both ends of the engine a tool may be inserted within the attachment 74 in the roller 73 and by turning the tool the roller is rotated to cause the rollover ring segments 40 and 55 to turn or rotate about the longitudinal axis of the engine 12 thereby rotating the engine about its longitudinal axis. In this manner the engine may be positioned at any angle around its longitudinal axis for access to all sides of the engine.

It is also frequently desirable either to ship the object or engine being handled or to operate the engine while supported in the support system with either instance requiring the support to react large forces which result from engine movement or thrust exerted by the engine operation thereby requiring a more substantial support than that heretofore generally described. In this application the handling differs slightly with the supporting apparatus illustrated in FIGS. 11 and 12. To accomplish this task support brackets 80 and 81 are provided which rest upon the rear rollover ring segment 40 of the cradle 11 and are held by bolts 82 and 83 and as previously described the engine is raised in a vertical direction. With the engine raised to the proper height, pedestals 85 and 86 are positioned on the extremities of the cradle 11 over the roller adapters 13 and 13a which include thrust pins 87 and 88 interfitting with bosses 75 and 76 on the engine as illustrated such that by again lowering the inner cradle to remove the weight supported by the brackets 80 and 81 the thrust pins 87 and 88 support the engine. Thereafter a yoke 90 may be bolted to the tops of the pedestals to extend over the engine as illustrated to react the torsional forces exerted on the pedestals such as would be encountered during ground operation of the engine. Sway braces 91 may be provided to center the engine on the thrust pins 87 and 88 and to resist side loads as may be encountered during shipment, also tie-downs 92 may be inserted through the clevises 93 to extend either to a supporting vehicle or to the floor of the vehicle transporting the complete system for more rigid support of the engine. Additionally an axial brace 94 is provided extending to the rails 14 and 14a to react greater axial directed forces as may be encountered particularly during ground operation of the engine. A bracket 95 may also be utilized interfitting with the handling bracket 68 for further support of the engine if desired. Naturally to return the engine to any of the other modes of handling as previously described the reverse of the procedure heretofore described is carried out with the brackets assembled as described.

It may therefore be seen that the subject invention provides a self-contained support system which is easily adaptable for handling any object desired for maintenance, transportation or testing operations with the support system being compact, lightweight and operable in a manner for vertical positioning or rotation of the object being handled. While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. Apparatus for handling elongated objects of essentially circular outline, such as gas turbine engines,
   said apparatus comprising a wheeled vehicle having a pair of elongated laterally spaced side rails,
   a pair of cradle assemblies extending between and spaced apart along the length of said rails,
   each of said assemblies comprising an inner cradle and an outer cradle both of which are generally of the same arcuate configuration with the concave portions thereof facing upwardly,
   one of said cradles being relatively fixed and secured at its opposite ends to said side rails,
   means guiding the other cradle for vertical movement relative to said one cradle from a lower position, in which the cradles are nested, to an elevated position,
   means acting between said cradles for effecting such relative movement, and
   bracket means to be attached to said object and supported by said relatively movable cradle whereby the object may be maintained in a lower position for transportation and raised to an elevated position for other purposes.

2. Apparatus for handling elongated objects of essentially circular outline, such as gas turbine engines,
   said apparatus comprising a wheeled vehicle having a pair of elongated laterally spaced side rails,
   a pair of cradle assemblies extending between and spaced apart along the length of said side rails,
   each of said assemblies comprising an inner cradle and an outer cradle both of which are generally of the same arcuate configuration with the concave portions thereof facing upwardly,
   the outer of said cradles being mounted at its opposite ends on said side rails and the inner of said cradles being guided for vertical, rectilinear movement relative thereto from a lower position nested within said outer cradle to an elevated position thereabove,
   a pair of actuators lying generally within the outline of said cradles when they are nested, the inner ends of said actuators being pivotally connected to said outer cradle and the outer ends of said actuators being pivotally connected to said inner cradle to provide means for raising said inner cradle to its elevated position,
   bracket means to be attached to said object and supported by said inner cradle whereby the object may be maintained in a lower position for transportation and raised to an elevated position for other purposes.

3. Apparatus for handling elongated objects of essentially circular outline, such as gas turbine engines,
   said apparatus comprising a wheeled vehicle having a pair of elongated laterally spaced side rails,
   a pair of cradle assemblies extending between and spaced apart along the length of said rails,
   each of said assemblies comprising an inner and an outer cradle both of which are generally of the same arcuate configuration with the concave portions thereof facing upwardly,
   one of said cradles being relatively fixed and mounted at its opposite ends on said rails,
   means guiding the other cradle for vertical movement relative to said one cradle from a lower position, in which the cradles are nested, to an elevated position,
   means acting between said cradles for effecting such relative movement,
   bracket means to be attached to said object and supported by said relatively movable cradle, said bracket means comprising an arcuate segment which is supported by said movable cradle,
   a pair of rotatable roll-over rolls mounted on said fixed cradle and spaced apart so that the arcuate segment of the bracket may pass therebetween,
   and a roll-over bracket securable to said object and to said segment to form a complete ring encircling said object, when the movable cradle is raised to said elevated position, said ring overlying said rollers whereby the movable cradle may be lowered and the object supported by said rollers and revolved around a horizontal axis.

4. Apparatus for handling elongated objects of essentially circular outline such as gas turbine engines,
   said apparatus comprising a wheeled vehicle having a pair of elongated laterally spaced side rails,
   a pair of cradle assemblies extending between and spaced apart along the length of said rails,
   each of said assemblies comprising an inner and an outer cradle, both of which are generally of the same arcuate configuration with the concave portions thereof facing upwardly, the outer of said cradles being mounted at its opposite ends on said side rails and the inner of said cradles being guided for vertical rectilinear movement relative thereto from a lower position nested within said outer cradle to an elevated position thereabove,
   a pair of actuators lying generally within the outline of said cradles when they are nested, the inner ends of said actuators being pivotally connected to said outer cradle and the outer ends of said actuators being pivotally connected to said inner cradle to provide means for raising said inner cradle to its elevated position,
   bracket means to be attached to said object and supported by said inner cradle, said bracket means comprising an arcuate segment,
   coacting means on said arcuate segment and said inner cradle for laterally positioning said bracket,
   whereby the bracket and the object to which it is attached may be raised to an elevated position,
   a pair of roll-over rolls rotatably mounted on said outer cradle and spaced laterally apart so that the arcuate segment of the bracket may pass therebetween,
   a roll-over bracket securable to said object and to said segment to form a complete ring encircling said object when the cradle is raised to its elevated position, said ring overlying said rollers, whereby the cradle may be lowered and the object supported by said rollers and revolved about a horizontal axis,
   a pair of risers respectively mounted on the pivotal connections between the actuators and the inner cradle, said risers being swingable from rest positions in which they lie within the outline of the inner cradle to upright positions extending above said pivotal connections,
   said risers having an upper surface engageable with the lower surface of said bracket segment and said bracket segment and risers having cooperative means for laterally positioning the bracket segment thereon, latching means on said outer cradle for supporting said bracket in said elevated position, said latching means and bracket having coacting means for laterally positioning said bracket, which means are spaced outwardly of the other lateral positioning means so that when the inner cradle is lowered, the risers may be swung to their upright positions, whereby the inner cradle may be raised a second time and the bracket and the object to which it is attached raised to a further elevated position in spaced relation above the inner cradle.

5. Apparatus for handling elongated objects of essentially circular outline, such as gas turbine engines, said apparatus comprising a wheeled vehicle having a pair of elongated laterally spaced side rails, a pair of cradle assemblies extending between and spaced apart along the length of said rails, each of said assemblies comprising an inner and an outer cradle, both of which are generally of the same arcuate configuration with the concave portions thereof facing upwardly, the outer of said cradles being mounted at its opposite ends on said side rails and the inner of said cradles being guided for vertical rectilinear movement relative thereto from a lower position nested within said outer cradle to an elevated position thereabove, a pair of actuators lying generally within the outline of said cradles when they are nested, the inner ends of said actuators being pivotally connected to said outer cradle and the outer ends of said actuators being pivotally connected to said inner cradle to provide means for raising said inner cradle to its elevated position, bracket means to be attached to said objects and supported by said inner cradle, coacting means on said bracket and said inner cradle for laterally positioning said bracket, whereby the bracket and the object to which it is attached may be raised to an elevated position, a pair of risers respectively mounted on the pivotal connections between the actuators and the inner cradle, said risers being swingable from a rest position in which they lie within the outline of the inner cradle to a raised position extending above said pivotal connections, said risers having an upper surface engageable with the lower surface of said bracket and said bracket and risers having coacting means for laterally positioning the bracket thereon, and latching means on said outer cradle for supporting said bracket in said elevated position, said latching means and bracket having coacting means for laterally positioning said bracket, which means are spaced outwardly of the other lateral positioning means so that when the inner cradle is lowered, the risers may be swung to their upright positions, whereby the inner cradle may be raised a second time and the bracket and the object to which it is attached raised to a further elevated position in spaced relation above the inner cradle.

6. Apparatus for handling elongated objects, such as gas turbine engines, said apparatus comprising a wheeled vehicle having a pair of elongated laterally spaced side rails, a pair of cradle assemblies extending between and spaced apart along the length of said rails, each of said assemblies comprising an inner cradle and an outer cradle, both of which are generally of the same arcuate configuration with the concave portions thereof facing upwardly, one of said cradles being relatively fixed and secured at its opposite ends to said side rails, means guiding the other cradle for vertical movement relative to said one cradle from a lower position, in which the cradles are nested, to an elevated position, means acting between said cradles for effecting such relative movement, bracket means to be attached to said object and supported by said relatively movable cradle whereby the object may be maintained in a lower position for transportation and raised to an elevated position for other purposes, a pair of risers mounted on said movable cradle, said risers being displaceable from a rest position to an upright bracket supporting position, latching means on said fixed cradle for supporting said bracket in said elevated position so that when the movable cradle is lowered, the risers may be disposed in their upright positions, whereby the movable cradle may be raised a second time and the bracket and the object to which it is attached raised to a further elevated position in spaced relation above the movable cradle.

7. Apparatus for handling objects, said apparatus comprising a cradle assembly including first and second cradle members, one of said cradle members being relatively fixed and the other cradle member being guided for vertical movement relative to said one cradle from a lower position to an elevated position, means for effecting such relative movement of the cradle members, bracket means to be attached to the object and supported by said relatively movable cradle whereby the object may be maintained in a lower position or raised to an elevated position, riser means mountable on said movable cradle, said riser means being positionable in an upright bracket supporting position, latching means on said fixed cradle member for supporting said bracket in said elevated position so that when the movable cradle is lowered, the riser means may be disposed in their upright positions, whereby the movable cradle may be raised a second time and the bracket and the object to which it is attached raised to a further elevated position in spaced relation above the movable cradle.

References Cited by the Examiner
UNITED STATES PATENTS

| | | | |
|---|---|---|---|
| 2,038,660 | 4/1936 | Kretzschmar | 254—2 |
| 2,655,114 | 10/1953 | Holdeman | 214—512 X |
| 2,920,773 | 1/1960 | Knabe | 214—1 |
| 2,921,784 | 1/1960 | Miller | 214—1 X |
| 2,940,769 | 6/1960 | Taylor | 214—1 X |
| 3,107,797 | 10/1963 | McFeaters | 214—18 |

MARVIN A. CHAMPION, *Primary Examiner.*